United States Patent [19]

Minami

[11] 4,291,897
[45] Sep. 29, 1981

[54] UNLOCKING DEVICE FOR SEATBELT SYSTEM

[75] Inventor: Yoriteru Minami, Toyota, Japan

[73] Assignee: Toyota Jidosha Kogyo Kabushiki Kaisha, Toyota, Japan

[21] Appl. No.: 112,176

[22] Filed: Jan. 15, 1980

[30] Foreign Application Priority Data

Mar. 9, 1979 [JP] Japan .............................. 54-30876[U]

[51] Int. Cl.³ ............................................. B60R 21/10
[52] U.S. Cl. .................................... 280/802; 280/807
[58] Field of Search ............... 280/801, 802, 803, 807, 280/804

[56] References Cited

U.S. PATENT DOCUMENTS

| | | | |
|---|---|---|---|
| 3,743,319 | 7/1973 | Winchell | 280/803 |
| 4,098,524 | 7/1978 | Ardizio | 280/801 |
| 4,189,170 | 2/1980 | Tanaka | 280/802 |

*Primary Examiner*—Robert R. Song

*Attorney, Agent, or Firm*—Koda and Androlia

[57] ABSTRACT

One end of an occupant restraining webbing is secured to a door of a vehicle and the other end is wound up into a retractor mounted in a console box provided at the substantially central portion of the vehicle, and the webbing is automatically fastened to or unfastened from an occupant in response to opening or closing of the door. The retractor is provided thereon with an emergency lock mechanism for locking the windoff rotation of the webbing in an emergency of the vehicle, and the occupant can operate an unlocking knob to unlock the emergency lock mechanism, so that he can escape from the compartment to the outside after a collision of the vehicle. The unlocking knob provided in the opening of the console box without protruding into the compartment during normal running condition of the vehicle, rotates in response to the control actuated by the occupant to unlock the emergency lock mechanism through an unlocking lever.

9 Claims, 5 Drawing Figures

UNLOCKING DEVICE FOR SEATBELT SYSTEM

BACKGROUND OF THE INVENTION

1. Field of the Invention

This invention relates to an unlocking device for use in a seatbelt system for unlocking an emergency locking device, and particularly to an unlocking device for allowing the windoff of a webbing of the seatbelt system as necessary.

2. Description of the Prior Art

There has been proposed an automatically fastening type seatbelt system wherein an outer end of an occupant restraining webbing is solidly secured to a frame of a door for entering and leaving the vehicle, whereby the intermediate portion of the webbing is adapted to pass over the occupant and to approach or separate from the occupant in response to the action of the door during opening or closing the door, so that the seated occupant can be automatically restrained or unrestrained in the seat of the webbing. In the seatbelt system above-mentioned, it is possible to automatically fasten the webbing to the occupant merely by the action of the door closing after the occupant is seated on the seat. Moreover, in an emergency of the vehicle, an inner end portion of the webbing is wound up and a retractor installed at the substantially central portion of the vehicle is adapted to instantly hinder the windoff of the webbing by the operation of an emergency lock mechanism, so that the occupant is reliably restrained, thereby improving the safety of the occupant.

However, in the seatbelt system as described above, when the vehicle is stopped in a condition of being tilted more than a given angle after a collision of the vehicle, the emergency lock mechanism still locks a takeup shaft of the retractor, thereby the restrained webbing hinders the opening of the door. That is, the occupant cannot escape from the compartment of the vehicle by the locking action of the webbing. For this reason, there has been already proposed an unlocking device for unlocking the emergency lock mechanism of the retractor from its operation as necessary.

An application concerning an unlocking device was filed on November 13, 1978 before Japanese Patent Office, whose number of laid open publication is Utility Model application No. 52-72962. An unlocking knob of the unlocking device is designed to be operated so as to allow the webbing to be wound off from the retractor as necessary, so that the door can be opened.

It is necessary for the unlocking knob to be installed at a position where the unlocking knob is very easily operable by the occupant in an emergency of the vehicle, and further, there is a need that the unlocking knob does not hinder the operation of the emergency lock mechanism. As viewed from this point, the unlocking knobs which have been developed heretofore have not been satisfactory.

SUMMARY OF THE INVENTION

In view of the above facts, it is the object of the present invention to provide an unlocking device, wherein an unlocking knob for unlocking the locking condition of an emergency lock mechanism of a retractor as necessary is prevented from operating during normal running condition of the vehicle and is easily operable in an emergency of the vehicle for allowing the occupant to escape from the compartment of the vehicle to the outside.

Means for mounting the unlocking knob according to the present invention is of such an arrangement that, during normal running condition of the vehicle, the means is flush with a front opening of a console box installed at the floor of the vehicle and has no projection at all, while, as necessary, if the unlocking knob is manually lifted up to a predetermined angle, the means is moved along with an unlocking lever rotatably secured to the unlocking knob so as to unlock the locking condition of the emergency lock mechanism of the retractor.

Description will hereunder be given of one embodiment of the present invention with reference to the accompanying drawings.

Figure 1:
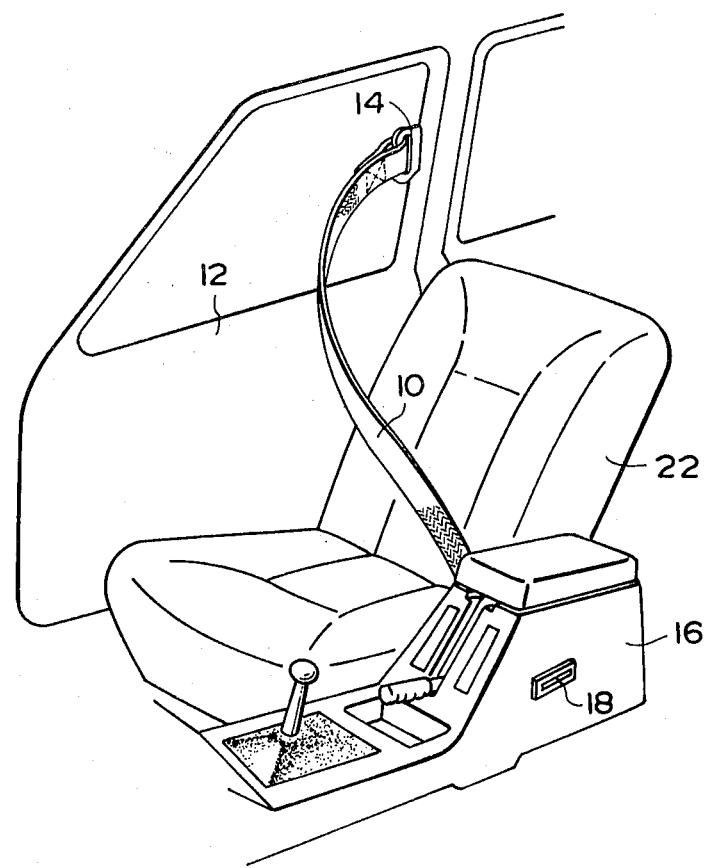
FIG. 1 is a perspective view of the interior of the compartment of the vehicle showing the unlocking device for the seatbelt system according to the present invention.

DESCRIPTION OF THE PREFERRED EMBODIMENT in FIG. 1, an outer end of an occupant restraining webbing 10 is solidly secured to a frame of a door 12 for entering or leaving the vehicle through an anchor plate 14, and the other end thereof is led into a console box 16 through an opening 18 in the console box 16, and wound up into a retractor 20 mounted to the console box 16. Consequently, the seated occupant is restrained by the webbing 10 diagonally passed over the seat 22.

A retractor 20 in the console box 16 is solidly secured to the inner surface of the console box 16 through a mounting bolt 26. The frame of the retractor 20 has two legs 28 and 30 at the opposite side thereof which are in parallel with each other, and rotatably supporting the end portions of a takeup shaft 32 of the retractor 20. The inner end of the webbing 10 is wound up in layers by the takeup shaft 32, which is biased in the wind up direction of the webbing 10 by a biasing force of a spiral spring 34 confined between the takeup shaft 32 and the leg 28.

Figure 3:
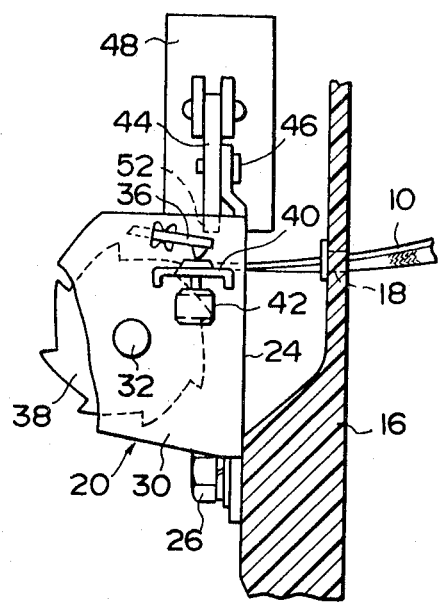
FIG. 3 is a side view of FIG. 2.

The both ends of a pawl 36 are pivotally supported by the legs 28 and 30, and the pawl 36 is installed at the position facing a pair of ratchet wheels 38 solidly secured to the takeup shaft 32. As shown in FIG. 3, the top part of the pendulum 42 suspended from a bracket 40 of the leg 30, and in an emergency of the vehicle the pendulum 42 is adapted to oscillate to tilt the pawl 36. The pendulum 42 is designed to be perpendicularly positioned by the weight of the pendulum 42 such that the right end of the pawl 36 touched to the top of the pendulum 42 is downwardly tilted and therefore, the left end of the pawl is separated from the ratchet wheels 38 during normal running condition of the vehicle. When the pawl 36 is tilted by the action of the pendulum 42, the pawl 36 is adapted to be meshed with the ratchet wheels 38 to prevent the ratchet wheels 38 and takeup shaft 32 from windoff rotation. Here, the ratchet wheels 38 and pendulum 42 constitute an emergency lock mechanism.

Figure 2:
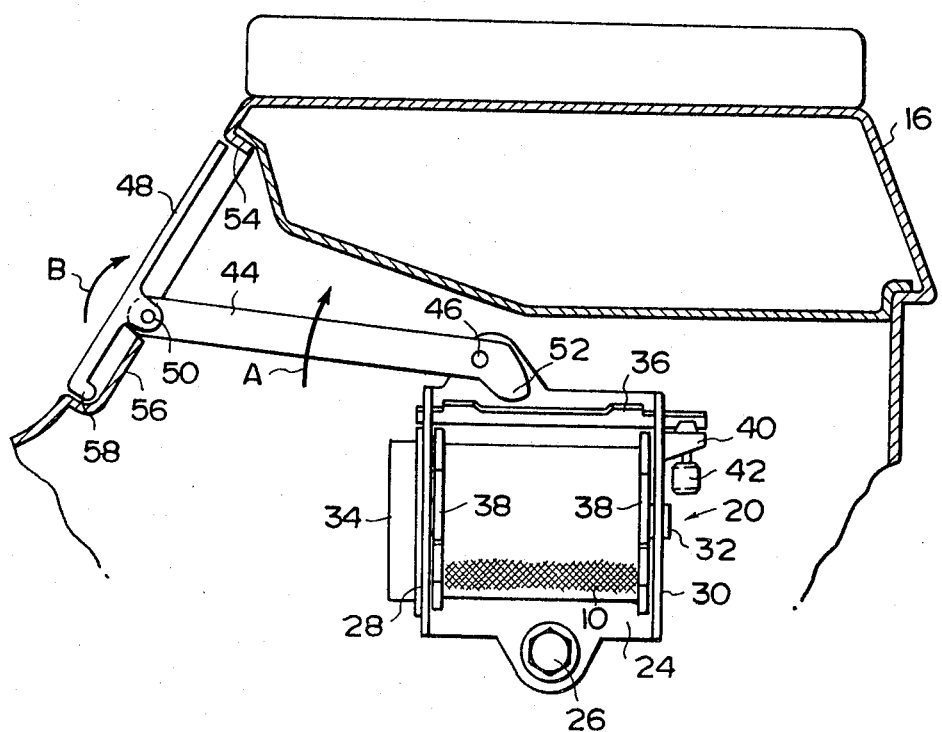
FIG. 2 is a cross-sectional view showing the console box cut in the longitudinal direction of the vehicle.

One end of an unlocking lever 44 is pivotally supported by the frame 24 of the retractor 20 through a pin 46, and the other end of the unlocking lever 44 pivotally supports an unlocking knob 48 through a pin 50. The one end of the unlocking lever 44 pivotally supported by the frame 24 constitutes a cam, which, when the unlocking knob 48 is lifted in the direction indicated by arrow B in FIG. 2, is rotated in the direction indicated by arrow A in FIG. 2 to be engaged with the pawl 36 to tilt the pawl 36 as described by the solid line in FIG. 3, so that the left end of the pawl 36 is forcedly separated from the ratchet wheels 38.

The unlocking knob 48 is installed in a rectangular opening 54 formed in the front surface of the console box 16. Since the outer surface of the unlocking knob 48 is flush with the outer surface of the console box 16 during normal running condition of the vehicle, the occupant can not carelessly turn the unlocking knob 48 around the pin 50.

At the lower end in the rectanglar opening 54 of the console box 16 is provided a stopper 56 having a letter L-shape in cross-section extending toward the pin 50 and being brought into contact with the unlocking lever 44 so as to restrict the turning angle of the unlocking lever 44. And the stopper 56 is adapted to abut against a bent portion 58 formed on lower end of the unlocking knob 48 so as to restrict the turning angle of the unlocking knob 48 in a direction opposite to arrow B in FIG. 4. In addition, a seatbelt system similar to the above may be provided on a seat of the vehicle.

In the present embodiment with the arrangement as described above, when an occupant opens the door 12 for entering the vehicle, the webbing 10 is moved forwardly in the vehicle in response to the action of the opening of the door. Hereby a space for the occupant to enter the vehicle is formed between the webbing 10 and the seat 22. Consequently, the occupant can move his body into the space thus formed, so that he may be seated on the seat 22, and, after being seated, he closes the door 12, whereby the webbing is moved again toward the seat 22, so that the webbing 10 can be fastened to the occupant.

The webbing 10 can be wound off from the retractor 20 during normal running condition of the vehicle, so that the occupant can easily change his driving posture. And there is no protrusion at all on the front surface of the console box 16, thereby preventing the occupant from mistakenly operating the unlocking knob 48.

Next, in case the vehicle has fallen into an emergency such as a collision, the pendulum 42 senses the acceleration of the vehicle and is oscillated, whereby the top face of the pendulum 42 pushes the pawl 36 up to tilt same, so that the pawl 36 meshes with the ratchet wheels 38. Consequently, the ratchet wheels 38 and takeup shaft 32 are locked and the windoff rotation of the webbing 10 is stopped, whereby the occupant is reliably restrained by the webbing, one end of which is solidly secured to the door 12 and the other end of which is restrained to the retractor 20, respectively, so that the occupant can be safely protected without being thrown out.

After the collision of the vehicle, when the occupant escapes from the compartment of the vehicle to the outside, it is necessary to open the door 12. In this case, when the emergency lock mechanism of the retractor 20 is still in the operating condition, the door 12 is prevented from being opened. That is, when the vehicle is tilted up to more than a predetermined angle in a stopping condition after the collision, the pendulum 42 pushes up the pawl 36 by the tilted position of the pendulum 42, which remains to be meshed with the ratchet wheels 38. Consequently, the webbing 10 cannot be wound off from the takeup shaft 32, thereby preventing the door 12 from being opened.

Figure 4:
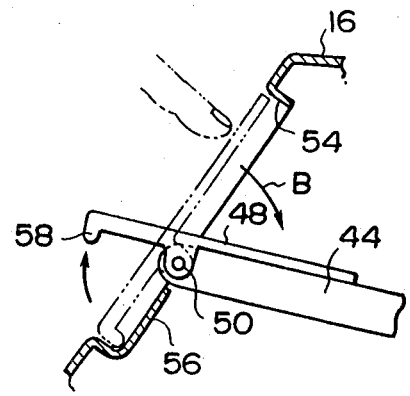
FIGS. 4 and 5 are drawings showing working conditions of the unlocking knob and unlocking lever as shown in FIG. 2, respectively.
Figure 5:
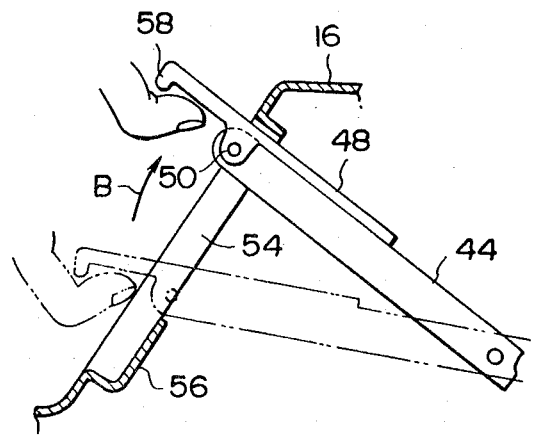

In such a case as described above, if the upper end portion of the unlocking knob 48 opposite to the bent portion 58 is pressed, then the unlocking knob 48 is rotated in the unlocking direction in the direction indicated by the arrow B in FIG. 4 around the pin 50, whereby the bent portion 58 is projected forwardly from the console box 16. If the occupant grasps the bent portion 58 of the unlocking lever 44 and further turns the unlocking knob 48 in the unlocking direction, then the unlocking knob 48 abuts against the unlocking lever 44 and thereafter the unlocking lever 44 is turned in the clockwise direction with the unlocking knob 48 by the occupant's operation and finally turns the unlocking lever 44 around the pin. As a result, a cam portion 52 of the unlocking lever 44 abuts against the pawl 36 to tilt the pawl 36, whereby the top of the pawl 36 is forcedly separated from the retchet wheels 38.

Consequently, the takeup shaft 32 can be rotated, thus enabling to wind off the webbing 10 from the takeup shaft 32. That is, the webbing 10 can be wound off from the retractor 20, whereby the door 12 can be opened, thereby enabling the occupant to safely escape from the compartment of the vehicle to the outside.

As has been described above, the surface of the unlocking device for a seatbelt system according to the present invention is adapted to be flush with the outer surface of the front opening of the console box and to turn the unlocking lever to unlock the emergency lock mechanism of the retractor when the unlocking device is turned in the unlocking direction, and hence, such excellent advantages can be offered that mistaken operation is eliminated during normal running condition of the vehicle and the emergency lock mechanism can be reliably unlocked in an emergency of the vehicle.

What is claimed is:

1. An unlocking device for a seatbelt system, wherein one end of an occupant restraining webbing is secured to a door of a vehicle so as to fasten the webbing to or unfasten from an occupant in response to opening or closing action of the door, comprising;
    (a) a retractor housed in a console box having a webbing takeup shaft for winding said occupant restraining webbing and a ratchet wheel solidly secured to said webbing takeup shaft;
    (b) an emergency lock mechanism having a pawl being adapted to be meshed with said ratchet wheel to prevent the webbing windoff rotation of said takeup shaft;
    (c) an unlocking knob installed in an opening formed in said console box; and
    (d) an unlocking lever pivotally mounted on a frame of said retractor, said unlocking lever rotatably supporting said unlocking knob at one end thereof and rotating along with the unlocking knob to unlock said emergency lock mechanism at the other end thereof when said unlocking knob is turned through more than a predetermined angle in the unlocking direction, whereby as the occupant turns said unlocking knob through more than a predetermined angle in the unlocking direction, said unlocking lever is turned together with said unlocking knob and the other end of said unlocking lever is brought into contact with said pawl to tilt said pawl, so that said pawl is separated from said ratchet wheel and the webbing can be wound off from said takeup shaft of said ratchet wheel.

2. An unlocking device as set forth in claim 1, wherein said webbing moves through an opening formed in the side surface of the console box in the crosswise direction of the vehicle.

3. An unlocking device as set forth in claim 1, wherein said retractor has ratchet wheels solidly secured to a webbing takeup shaft and a pawl is adapted to mesh with said ratchet wheels to prevent the webbing windoff rotation of said takeup shaft.

4. An unlocking device as set forth in claim 1, wherein said pawl is actuated by a pendulum sensing the acceleration of the vehicle.

5. An unlocking device as set forth in claim 1, further comprising a cam formed at the other end of said unlocking lever, said cam being adapted to be brought into contact with said pawl to separate said pawl from said ratchet wheel when said unlocking lever is turned through more than a predetermined angle.

6. An unlocking mechanism as set forth in claim 1, wherein said opening is formed in the surface of the console box, said surface facing forwardly.

7. An unlocking device as set forth in claim 1, wherein said unlocking knob is pivotally supported at the intermediate portion thereof by said unlocking lever.

8. An unlocking device as set forth in claim 7, wherein a bent portion formed at one end of said unlocking knob is adapted to abut against a stopper formed on the console box to prevent the unlocking knob from rotating in a direction opposite to the unlocking direction of said unlocking knob.

9. An unlocking knob for use in a seatbelt system wherein a webbing is fastened to or unfastened from an occupant in response to opening or closing action of a door when the occupant enters or leaves the vehicle, said webbing restrains the occupant to secure the occupant in safety in an emergency of the vehicle and said unlocking device unlocks the restrainment of the occupant by said webbing as necessary, comprising:

(a) a console box provided at the substantially central portion of the vehicle;

(b) a retractor housed in said console box having a webbing takeup shaft for winding said webbing by a biasing force thereof and a ratchet wheel solidly secured to said webbing takeup shaft;

(c) an emergency lock mechanism provided on said retractor for preventing the webbing from being wound off in an emergency of the vehicle, said emergency lock mechanism including a pawl being adapted to be meshed with said ratchet wheel and actuated by an acceleration sensor to prevent the webbing windoff rotation of said takeup shaft;

(d) an unlocking lever having a cam portion at one end thereof, said unlocking lever being pivotally supported by said retractor, said cam portion being adapted to forcedly separate said pawl from the ratchet wheel to enable the takeup shaft to make the webbing windoff rotation when said unlocking lever is rotated in an unlocking direction; and (e) an unlocking knob pivotally supported by the forward end of said unlocking lever for blocking an opening provided on said console box during normal condition of the vehicle, said unlocking knob being turned by the occupant through more than a predetermined angle in the unlocking direction to rotate said unlocking lever, so that the webbing can be wound off from the takeup shaft.

* * * * *